US006606164B1

(12) United States Patent
Irie et al.

(10) Patent No.: US 6,606,164 B1
(45) Date of Patent: Aug. 12, 2003

(54) TECHNIQUE FOR CONTROLLING THE EXECUTION OF AN ACTION IN A LOW LAYER SYSTEM BY A HIGH LAYER SYSTEM

(75) Inventors: Toshiya Irie, Yokohama (JP); Kiyoshi Watanabe, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/382,366

(22) Filed: Aug. 24, 1999

(30) Foreign Application Priority Data

Aug. 24, 1998 (JP) ............................................ 10-237472

(51) Int. Cl.[7] .......................... G06F 15/00; G06F 13/00
(52) U.S. Cl. ................... 358/1.15; 358/1.16; 709/100; 709/101; 709/102; 709/103; 709/104; 709/105; 709/106; 709/217; 709/250; 710/15; 710/16; 710/17; 710/18; 710/19; 710/28; 710/58; 710/59
(58) Field of Search ........................... 358/1.15, 1.16; 709/101–106, 250, 217; 710/15–19, 28, 58, 59

(56) References Cited

U.S. PATENT DOCUMENTS

| 4,517,641 A | * | 5/1985 | Pinheiro ........................ 710/20 |
| 5,613,160 A | * | 3/1997 | Kraslavsky et al. ........... 710/16 |
| 5,828,904 A | * | 10/1998 | Batson et al. .................. 710/58 |
| 6,474,881 B1 | * | 11/2002 | Wanda .......................... 400/61 |
| 2002/0001100 A1 | * | 1/2002 | Kawanabe ................... 358/1.15 |
| 2002/0030839 A1 | * | 3/2002 | Kawanabe et al. .......... 358/1.13 |
| 2002/0030848 A1 | * | 3/2002 | Moriyama et al. .......... 358/1.15 |

FOREIGN PATENT DOCUMENTS

JP            190365          7/1997   ........... G06F/11/28

* cited by examiner

Primary Examiner—Edward Coles
Assistant Examiner—Alan Rahimi
(74) Attorney, Agent, or Firm—Gregory M. Doudnikoff

(57) ABSTRACT

In a network system in which a request of executing a process is sent from the higher level system to the lower level system, a time period of not executing a requested job is assured in the lower level system while assuring an asynchronism between the both systems and a certainty of the requested job. The higher level system transmits a pair of signals (a preparatory signal and an execution signal) to the lower level system in a predetermined interval after it holds a processing request to be sent to the lower system. The higher level system then resumes transmission of the processing request a predetermined time after transmitting the pair of signals. The lower level system calculates an estimated time which will be required to process the processing request currently requested to process using the pair of signals and determines whether or not the sum of the estimated time and the time of a predetermined operation which is executed while the processing request is not accepted is less than the time during which the higher level system holds the processing request. The predetermined operation is executed only when the sum of the times is less than the time during which the higher level system holds the processing request.

8 Claims, 7 Drawing Sheets

TECHNIQUE FOR CONTROLLING THE EXECUTION OF AN ACTION IN A LOW LAYER SYSTEM BY A HIGH LAYER SYSTEM

BACKGROUND OF THE INVENTION

1. Field of the Invention

This invention relates to a data processing method in a computer network and, more particularly, to a technique for permitting a higher level system to control the execution of operations in a lower level system.

2. Description of the Related Art

FIG. 9 is a diagram showing an example of a conventional network system. In the network system shown in this figure, data communication is mainly from a higher level system to a lower level system and there is virtually no data communication from the lower level system to the higher level system.

In such a network system, it is occasionally needed to halt a functional operation in order to perform a maintenance operation or the like in the lower level system. On such occasion, it is necessary to monitor, control, save and restore a job under processing by the lower level system at the point of interruption as well as a job irregularly sent from the higher level system.

It was conventionally necessary in performing such work to impose a constraint of time and function for system operator intervention and operation to assure halting of job transfer (user operation constraint) and operation of the higher level system based on a system operation plan for performing periodic maintenance in the lower level system. However, such preparatory work did not entirely eliminate a possibility of a loss of a spool job due to a human error or fault of information transmission.

SUMMARY OF THE INVENTION

It is an object of this invention to assure, in a network system in which a request to execute a process is sent from a higher level system to a lower level system, a time period of executing a predetermined action which is executed when a requested job is not executed in the lower level system while assuring an asynchronism between the both systems and a certainty of the requested job.

It is another object of this invention to provide a system which can safely perform an internal operation which accompanies a periodical maintenance operation and a halting of a function in a lower level system while assuring restoration and processing of a job in a spool pipe without stopping to receive a job in the higher level system.

It is a further object of this invention to provide a network system which is highly reliable with a low cost.

The higher level system sends a pair of preparatory signal and an execution signal to the lower level system in a predetermined time interval after holding a processing request which the higher level system sends to the lower level system. The higher level system then resumes transmission of the processing request after a predetermined length of time has elapsed. The lower level system uses these two signals to calculate an estimated time which will be needed to process the job currently requested and determines whether or not the sum of the estimated time and a time of the predetermined operation executed in a state not accepting the processing request is less than the time during which the higher level system holds the request to process. Only when the time is less than the time during which the processing request is held, the predetermined operation is executed.

This invention provides, in one aspect thereof, a method of executing a predetermine operation executed on a printer in a network system in which a plurality of print jobs are sent from a printer server to said printer side, the method comprising the steps of (a) receiving a plurality of print jobs sent from said printer server to hold them in a spool; (b) receiving a preparatory signal sent from said printer server to hold it in the spool; (c) receiving an execution signal sent from said printer sever to hold it in the spool; (d) taking out said plurality of print jobs successively from said spool for printing; (e) taking out said preparatory signal from said spool to start an internal timer; (f) taking out said execution signal from said spool to determine whether or not there is an enough time to execute a predetermined operation; and (g) executing the predetermined operation in said printer when it is determined that there is an enough time to execute the predetermined operation.

This invention provides, in another aspect thereof, a method of executing a predetermined operation executed in a lower level system in a network system in which a request to process a jobs is sent from a higher level system to said lower level system, said method comprising the steps of (a) receiving a processing request from said higher level system to hold it in a spool; (b) holding a preparatory signal and an execution signal sent from said higher level system in a predetermined interval in said spool; (c) taking out said request from said spool for processing; (d) determining whether or not there is an enough time to execute a predetermined operation based on the difference of the time to take out said preparatory signal and the time to take out said execution signal from said spool; and (e) executing the predetermined operation in said lower level system when it is determined that there is an enough time to execute the predetermined operation.

In a further aspect of this invention, said predetermined operation is one of a system reset, clearing the spool, re-booting a module in which a fault occurred, fault diagnostic and cleaning.

This invention provides, in a further aspect thereof, a method of transmitting data in a network system in which a plurality of requests to process a jobs are sent from a higher level system to a lower level system, said method comprising the steps of (a) executing a first time interruption at a first time to hold a processing request to be sent to said lower level system; (b) transmitting a preparatory signal to said lower level system; (c) executing a second timer interruption at a second time a predetermined time after said first time to transmit an execution signal to said lower level system; and (d) executing a third timer interruption at a third time a predetermined time after said second time to release the hold in said step (a) and resume the processing request.

This invention provides, in a further aspect thereof, a method of executing a predetermined operation executed in a lower level system in a network system in which a processing request is sent from a higher level system to said lower level system, said method comprising the steps of (a) transmitting a first request of processing a job from said higher level system to said lower level system; (b) receiving the first request from said higher level system to hold it in a spool of said lower level system; (c) executing a first time interruption in said higher level system at a first time to hold a second request sent from said higher level system to said lower level system; (d) transmitting a preparatory signal from said higher level system to said lower level system; (e) receiving the preparatory signal from said higher level system to hold it in the spool of said lower level system; (f) executing a second timer interruption at a second time a predetermined time after said first time to transmit an execution signal to said lower level system; (g) receiving the execution signal from said higher level system to hold it in the spool of said lower level system; (h) taking out said first request from said spool in said lower level system for processing; (i) determining whether or not there is an enough time to execute a predetermined operation based on the difference of the time to take out said preparatory signal and the time to take out said execution signal from said spool in said lower level system; (j) executing the predetermined operation in said lower level system when it is determined that there is an enough time to execute the predetermined operation; (k) executing a third timer interruption at a third time a predetermined time after said second time to release the hold in said step (c) and transmit said second request to said lower level system; (L) receiving the second request from said higher level system to hold it in the spool of said lower level system; and (m) taking out said second request from said spool for processing in said lower level system.

This invention provides, in a further aspect thereof, a printer for receiving a print job sent from a printer server for printing, said printer comprising (a) a data receiving part for receiving a print job, a preparatory signal and an execution signal sent from said printer server; (b) a spool for holding said print job, said preparatory signal and said execution signal; (c) a job spool control part for successively taking out said print job, said preparatory signal and said execution signal held in said spool; (d) an output part for printing plurality of said print jobs; (e) a time difference detecting part for analyzing the preparatory signal and the execution signal taken out from said spool; (f) an independent timer measuring mechanism for measuring the difference of the times detecting said preparatory signal and said execution signal; and (g) a predetermined functional operation determining/ controlling part for determining whether or not there is an enough time to execute the predetermined operation based on said difference of times.

This invention provides, in a further aspect thereof, a lower level system for processing a processing request sent from a higher level system, comprising (a) a spool for holding the processing request, a preparatory signal and an execution signal sent from said higher level system; (b) a processing part for taking out said request from said spool for processing; (c) a time difference detecting part for detecting said preparatory signal and said execution signal; (d) a predetermined functional operation determining/ controlling part for determining whether or not there is an enough time to execute a predetermined operation based on the difference of times to take out said preparatory signal and said execution signal from said spool; and (e) a predetermined functional operation mechanism for executing the predetermined operation in said lower level system when it is determined that there is an enough time to execute the predetermined operation.

In a further aspect of this invention, said predetermined functional operation mechanism executes either one of a system reset, clearing the spool, re-booting of a module in which a fault occurs, fault diagnostic and cleaning in said lower level system.

This invention provides, in a further aspect thereof, a higher level system for transmitting a plurality of requests to process a job, comprising (a) a time difference job signal generating part for generating a preparatory signal and an execution signal; (b) a data transmitting part for transmitting a processing request, a preparatory signal and an execution signal to said lower level system; (c) an independent timer measuring mechanism for measuring the time of executing a timer interruption; and (d) a spool holding intervention part responsive to said timer interruption to manage holding and resumption of the processing request to be sent to said lower level system.

This invention provides, in a further aspect thereof, a recording medium storing a control program for managing execution of a predetermined operation executed on a printer in a network system in which a plurality of print jobs are sent from a printer server to said printer side, said control program comprising (a) a program code to instruct said printer to receive a plurality of print jobs sent from said printer server to hold them in a spool; (b) a program code to instruct said printer to receive a preparatory signal sent from said printer server to hold it in the spool; (c) a program code to instruct said printer to receive an execution signal sent from said printer server to hold it in the spool; (d) a program code to instruct said printer to take out said plurality of print jobs successively from said spool for printing; (e) a program code to instruct said printer to take out said preparatory signal from said spool to start an internal timer; (f) a program code to instruct said printer to take out said execution signal from said spool to determine whether or not there is an enough time to execute a predetermined operation; and (g) a program code to instruct said printer to execute the predetermined operation in said printer when it is determined that there is an enough time to execute said predetermined operation.

This invention provides, in another aspect thereof, a recording medium storing a control program for managing execution of a predetermined operation executed in a lower level system in a network system in which a processing request is sent from a higher level system to said lower level system, said control program comprising (a) a program code to instruct said printer to receive a processing request from said higher level system to hold it in a spool; (b) a program code to instruct said printer to hold a preparatory signal and an execution signal sent from said higher level system in a predetermined interval in said spool; (c) a program code to instruct said printer to take out said request from said spool for processing; (d) a program code to instruct said printer to determine whether or not there is an enough time to execute a predetermined operation based on the difference of the time to take out said preparatory signal and the time to take out said execution signal from said spool; and (e) a program code to instruct said printer to execute the predetermined operation in said lower level system when it is determined that there is an enough time to execute the predetermined operation.

In a further aspect of this invention, the predetermined operation is one of a system reset, clearing the spool, re-booting a module in which a fault occurred, fault diagnostic and cleaning.

This invention provides, in a further aspect thereof, a recording medium storing a control program for controlling transmission of data in a network system in which a plurality of processing requests are sent from a higher level system to said lower level system, said control program comprising (a) a program code to instruct said printer to execute a first time interruption at a first time to hold a processing request to be sent to said lower level system; (b) a program code to instruct said printer to transmit a preparatory signal to said lower level system; (c) a program code to instruct said printer to execute a second timer interruption at a second time a predetermined time after said first time to transmit an execution signal to said lower level system; and (d) a program code to instruct said printer to execute a third timer interruption at a third time a predetermined time after said second time to release the hold in said step (a) and resume the processing request.

DESCRIPTION OF THE PREFERRED EMBODIMENT

A. Hardware Configuration

Figure 1:
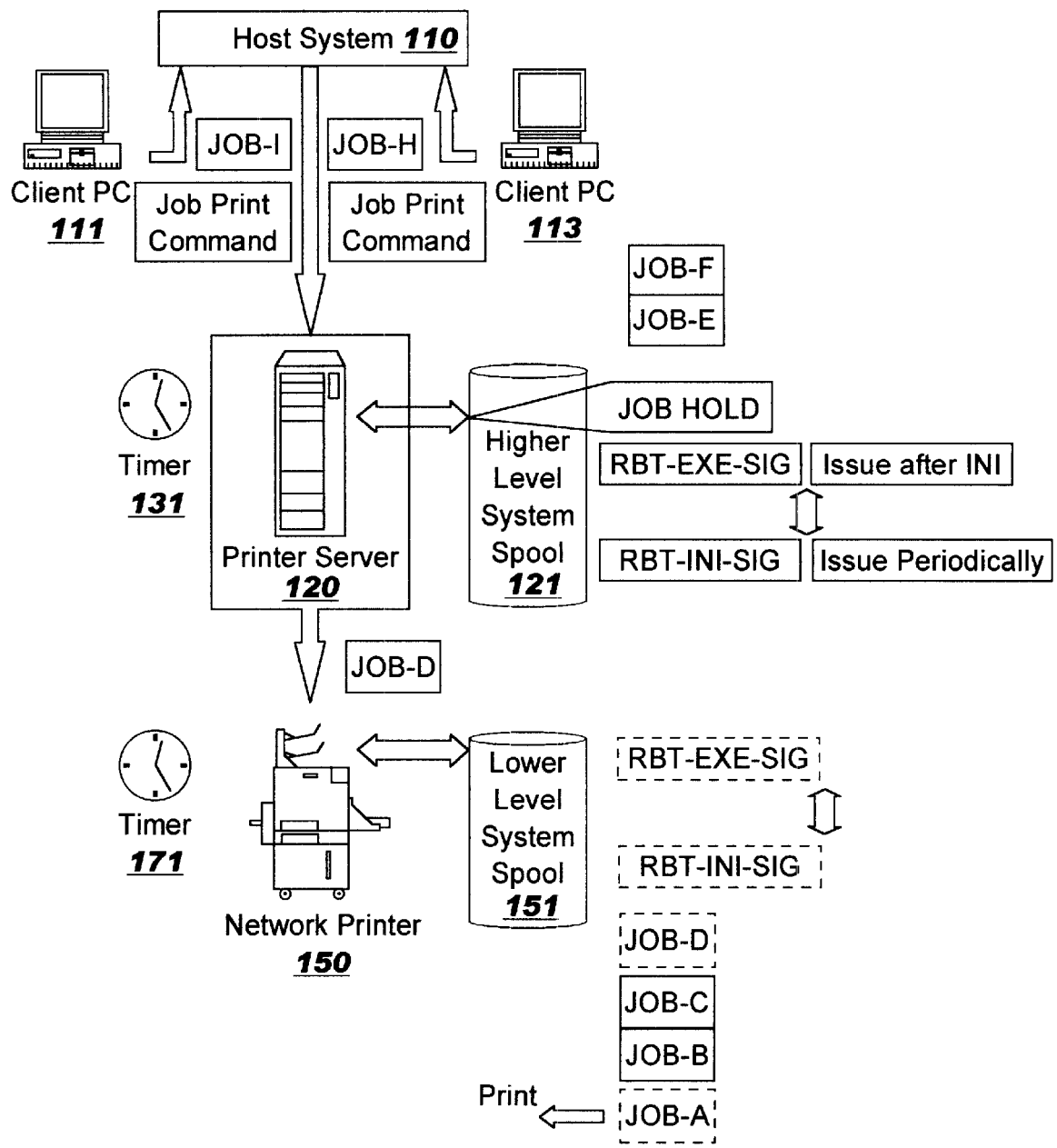
FIG. 1 is a schematic diagram showing the operation of a data processing system in the preferred embodiment of this invention.
Figure 2:
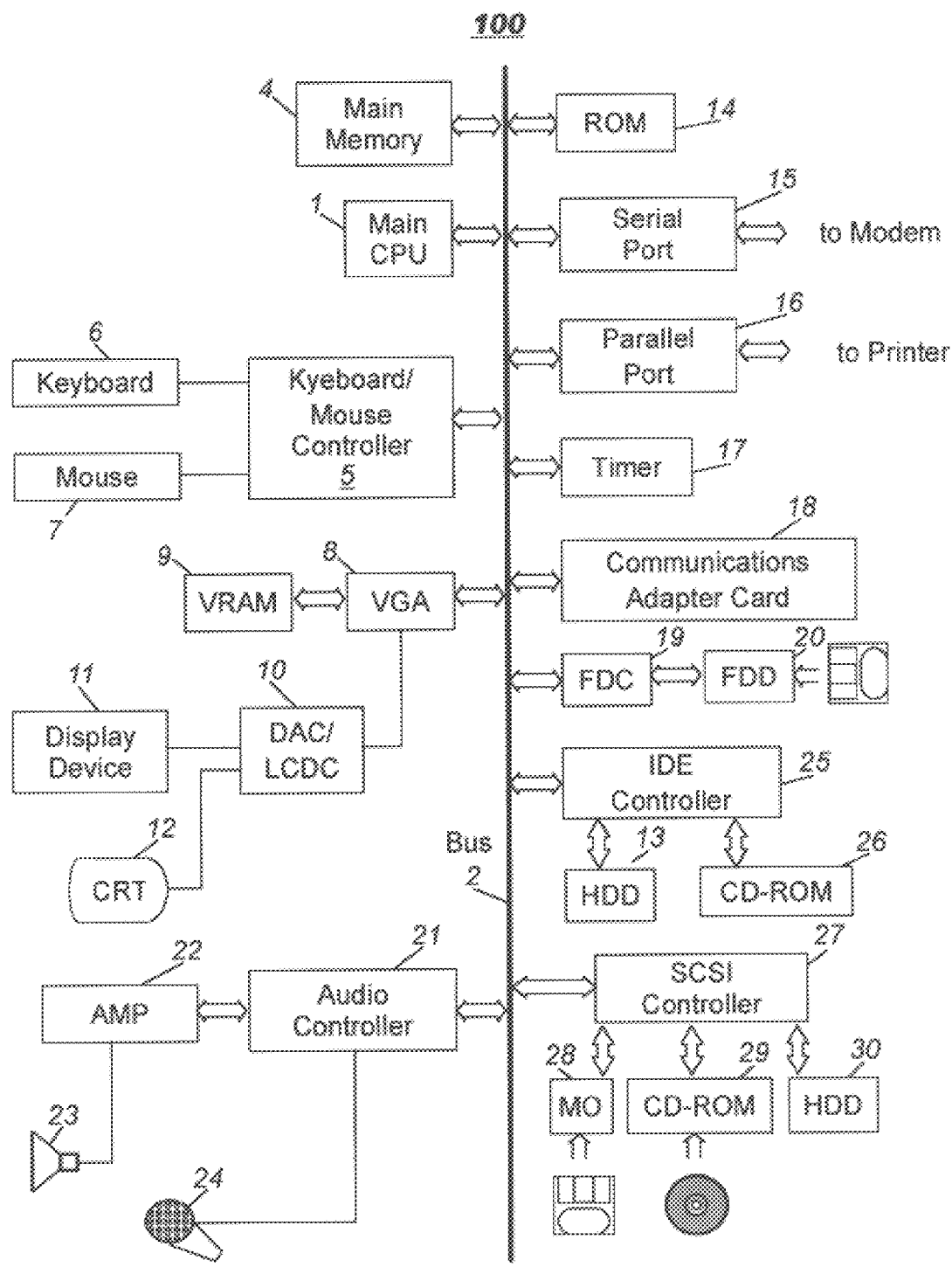
FIG. 2 is a block diagram showing an embodiment of a hardware configuration of a printer server in this invention.

An embodiment of this invention is now described with reference to the drawings. FIG. 1 shows a schematic diagram of a hardware configuration of a printer server 120 according to the present invention. As illustrated in FIG. 2, the printer server 120 comprises a central processing unit (CPU) 1 and memory 4. The CPU 1 and the memory 4 are connected to a hard disk device 13 as an auxiliary storage via a bus 2. A floppy disk device 20 (or recording medium drives such as an MO and CD-ROM) is connected to the bus 2 through a floppy disk controller 19.

A floppy disk (or recording medium such as an MO and CD-ROM) 24 is inserted to the floppy disk device 20 (or recording medium drives such as an MO and CD-ROM). Computer program code which gives instructions to the CPU 1 and the like in cooperation with an operating system to practice this invention is recorded on the floppy disk, the hard disk device 13, and a ROM 14 and executed by being loaded in the memory 4. The computer program code may be compressed or divided into pieces for recording in a plurality of media.

Further, the printer server 120 may be a system provided with user interface hardware including a pointing device 7 (such as a mouse, a joystick, etc.) or a keyboard 6 for inputting, and a display or CRT 12 for presenting image data to the user. A printer may be connected via a parallel port 16. A voice processing processor, a data input device, a voice synthesizer processor, or an automatic telephone exchange-computer control device may be connected to a modem via a serial port 15 and to a network via the serial port 15 and the modem or a token ring and a communication adapter 18 for communication with other computer systems.

It will be readily understood that the printer server 120 may be implemented in the form of a conventional personal computer (PC), a work station, a general purpose machine or a combination thereof. These components are cited as an example and it is not meant that all of them are indispensable components of this invention. Particularly, the printer server 120 does not need to have a user interface and it is sufficient for the printer server 120 to have a basic data processing function, such as a a CPU and a memory, and a communication function.

The operating system of the printer server 120 may support a GUI multi-windows environment as a standard such as Windows NT, Windows 95, Windows 3.x (Windows NT, Windows 95 and Windows are a trademarks of Microsoft Corporation), OS/2 (a trademark of International Business Machines Corporation), X-WINDOW System (a trademark of MIT) or AIX (a trademark of International Business Machines Corporation), may provide a character based environment such as MS-DOS (a trademark of Microsoft Corporation), or a real time OS such as OS/Open (a trademark of International Business Machines Corporation) and VxWorks (a trademark of Wind River Systems, Inc.). However, the operating system is not limited to any specific operating system environment.

The network printer 150 (FIG. 1) may be any conventional printer which can be connected to a network.

B. System Configuration

With reference to the block diagram of FIG. 2, the system configuration of the printer server 120 and the printer 150 according to the preferred embodiment of this invention is now described.

Figure 3:
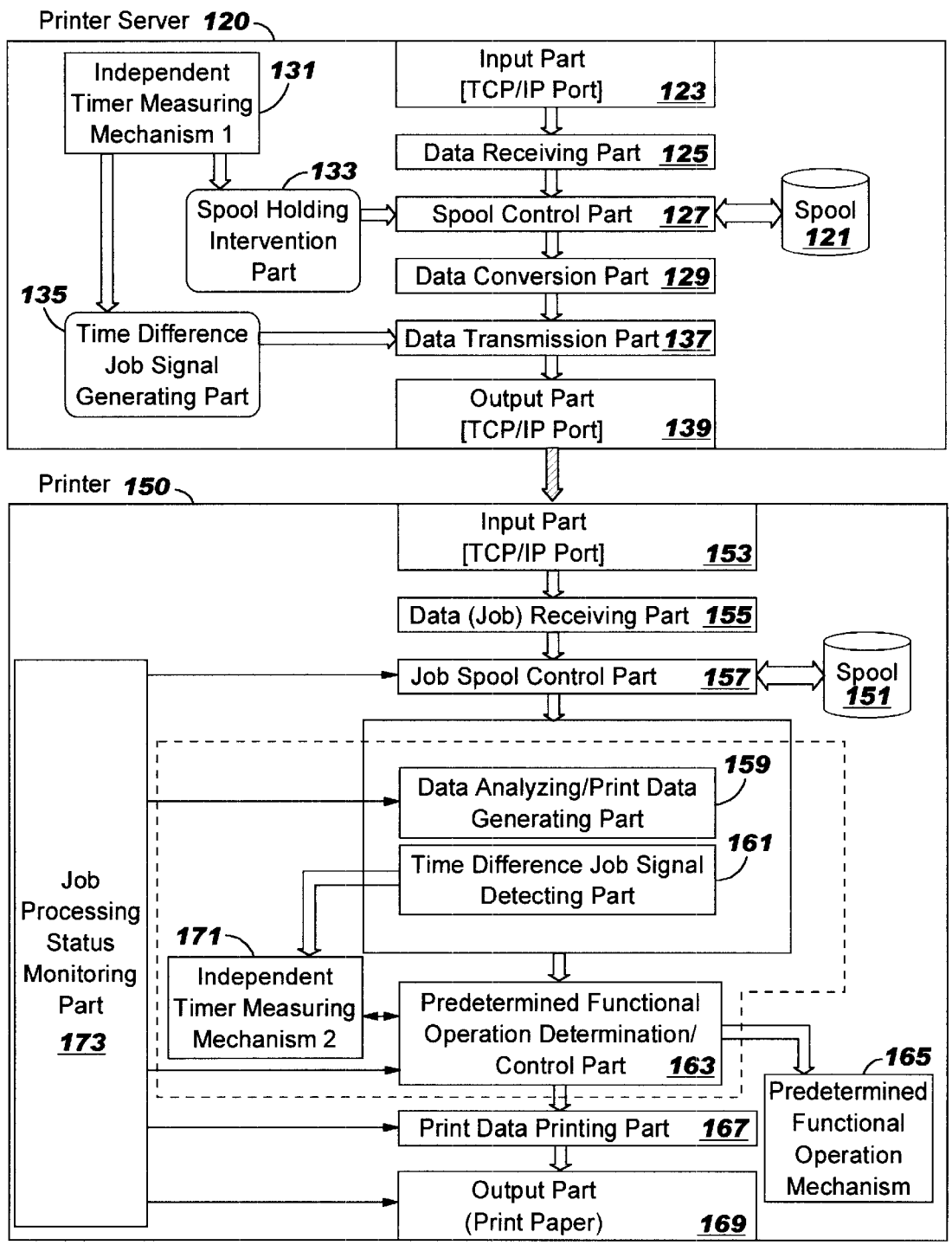
FIG. 3 is a block diagram showing an embodiment of processing components the data processing system of this invention.

FIG. 3 is a functional block diagram of the printer server 120 and the printer 150 in the preferred embodiment of this invention. The printer server 120 is provided with an input part 123, a data receiving part 125, a spool control part 127, a spool 121, a data conversion part 129, a data transmission part 137, an output part 139, an independent timer measuring mechanism 131, a spool holding intervention part 133, and a time difference job signal generating part 135.

In the preferred embodiment of this invention, the input part 123 and the output part 139 are implemented as TCP/IP ports and support a data communication with other systems. Because the input part 123 and the output part 139 in the preferred embodiment of this invention adopt the TCP/IP protocol which is a general purpose protocol, they can communicate with a plurality of lower level systems (such as a lower level printer) to have each lower level system execute the procedure of this invention. The data receiving part 125 and the data transmitting part 137 perform data transmission and receiving.

The spool control part 127 takes out data stored in the spool 121 when a predetermined condition is satisfied to deliver it to the data conversion part 129. The data conversion part 129 converts the print data delivered from the spool control part 127 to a form of a job which causes the printer 150 to execute and delivers it to the data transmission part 137.

The independent timer measuring mechanism 131 detects a preset time and executes a predetermined interruption at that time. The spool holding intervention part 133 instructs the spool control part 127 to interrupt to take out data from the spool 121. The time difference job signal generating part 135 generates a command job to control the printer side, which will be described later in this specification.

The printer 150 in the preferred embodiment of this invention comprises a spool 151, an input part 153, a data receiving part 155, a spool control part 157, a data analyzing/print data generating part 159, a time difference job signal detecting part 161, a predetermined functional operation determination/control part 163, a predetermined functional operation mechanism 165, a print data printing part 167, an output part 169, an independent timer measuring mechanism 171 and a job processing status monitoring part 173.

Preferably, the input part 153 of the printer side is also implemented as a TCP/IP port and supports data communication with other systems. Because TCP/IP is a general purpose protocol, the lower level system (in this case, the printer 150) can communicate with a plurality of higher level systems (such as the printer server 120). The data receiving part 155 affirms data arriving at the input part 153 and delivers it to the job spool control part 157.

The job processing status monitoring part 173 monitors the processing status of a job arriving at the printer 150. The job spool control part 157 stores job data delivered from the data receiving part 155 in the spool 151 and takes out the job data stored in the spool 151 when a predetermined condition is satisfied (the spool control part 157 inquires to the job processing status monitoring part 173 about the processing status of the job) to deliver it to the data analyzing/print data generating part 159.

The data analyzing/print data generating part 159 examines data received from the job spool control part 157 to determine whether the data is print data or data other than print data such as a time difference job signal. When it is determined that the data is print data, the data analyzing/print data generating part 159 converts the data is to a data from which is suitable for printing.

When the data analyzing/print data generating part 159 determines that the data received from the job spool control part 157 is data other than print data, such as command data, the time difference job signal detecting part 161 examines the data to determine whether or not it is in a format corresponding to a time difference job signal. When it is determined that the data is in a format corresponding to a time difference job signal, the time difference job signal detecting part 161 instructs the independent timer measuring mechanism 171 to execute a predetermined interruption to comply with the information or instruction contained in the data from the time difference job signal. The independent timer measuring mechanism 171 contacts the internal time of the printer 150 to execute the predetermined interruption at that time.

The predetermined functional operation determination/control part 163 inquires of the job processing status monitoring part 173 as to whether or not the printer 150 is in a predetermined condition and instructs the predetermined functional operation mechanism 165 to execute the predetermined operation when it is detected that the printer 150 is in the predetermined condition. The predetermined operation may include maintenance work such as a system reset, clearing the spool, restoration of a fault such as re-booting a module in which a fault occurs, fault diagnostic, and cleaning, which can be executed by issuing an internal command.

The predetermined functional operation mechanism 165 executes a predetermined function in response to an instruction of the predetermined functional operation determination/control part 163. The print data printing part 167 converts print data generated by the data analyzing/print data generating part 159 to data which is suitable for printing (such as bit map data). The output part 169 prints on print paper based on the data converted by the print data printing part 167.

While the functional components shown in FIG. 3 have been described, they are functional blocks and it is not meant that each of them is implemented in the form of discrete hardware or software. They may be implemented in the form of compound or common hardware or software. It is not meant that all the functional blocks are necessarily indispensable components of this invention.

C. Description of Operation

The operation of the network system 100 in the preferred embodiment of this invention as shown in FIG. 2 is now described with reference to the schematic diagram of the system shown in FIG. 3 and flow charts shown in FIGS. 5 and 6.

1. Description of Operation of the Higher Level System

A summary of the operation of the higher level system is first described with reference to FIG. 3. It is necessary in the higher level system side to suppress transmission of a print job to the lower level system while the lower level system performs a predetermined functional operation. For this reason, the higher level system generates a special signal job to notify the lower level system of the execution time of the predetermined function and transfers the job to the lower level system. In the preferred embodiment of this invention, this signal job comprises of a pair of jobs which consist of a first preparatory signal (RBT_INI_SIG) and an execution signal (RBT_EXE_SIG) which is re-issued after a time interval (INT_TMR) which is set depending on the quantity, the quality and the interval of a preprocessed job, and the processing capability of the lower level system.

When the preparatory signal is generated, the printer server 120, which is a higher level system, holds a job from a system higher than the printer server 120, such as the host system 110 in FIG. 1. This prevents the job from flowing down to the lower level system (the network printer 150, in this case). The amount of holding time (HLD_TMR) is also set depending on the quantity, the quality and the interval of the job, and the processing capability of the lower level system, in a manner similar to the setting of the time interval (INT_TMR).

Figure 5:
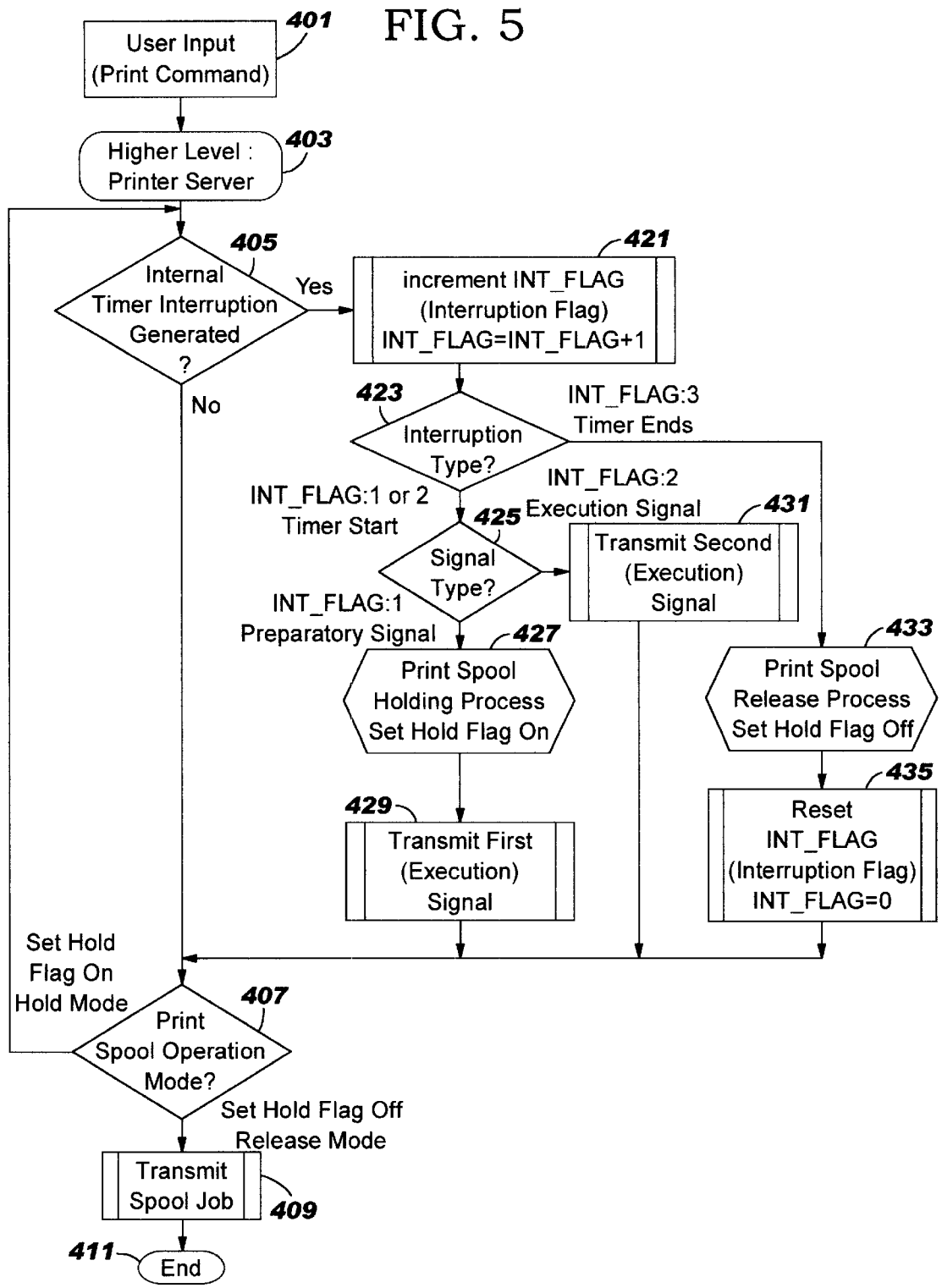
FIG. 5 is a flow chart showing an operational procedure of a higher level system in the preferred embodiment of this invention.

FIG. 5 is a flow chart showing the operational procedure of the higher level printer server 120 according to the preferred embodiment of this invention. In the preferred embodiment, a print command issued by a higher level system (such as the host system 110) arrives at the printer server 120 and is stored in the spool 121 (Steps 401, 403). The printer server 120 in the preferred embodiment of this invention converts the print data stored in the spool 121 and ascertains the current print spool operation mode before transmitting the data to the network printer 150 (Step 407).

When the current print spool operation mode is a hold mode (a state in which a hold flag to be described later is on), the printer server 120 waits until the hold flag is turned off and does not transmit a spool job. On the other hand, when the current print spool operation mode is a release mode (a state in which the hold flag is off), the printer server 120 transmits the spool job (Step 409).

The printer server 120 determines at every predetermined time whether or not an internal timer interruption has been generated (Step 405). When it is determined that an internal timer interruption has been generated, the printer server 120 increments an interruption flag (Step 421). In the preferred embodiment of this invention, the interruption flag is set to "0" while the hold flag is set to "off" at the initial condition. After the interruption flag is incremented in Step 421, the printer server 120 inquires about the interruption type (Step 423). In the preferred embodiment of this invention, the interruption type is managed by the interruption flag. When the interruption flag is set to "3", this is an indication that the timer procedure of this invention is ended and the printer server 120 executes post processing (Steps 433, 435) upon determining that the timer has ended. When the interruption flag is other than "3", the printer server 120 issues a preparatory signal or an execution signal, depending on the signal type, as discussed below with respect to Steps 425–431.

When the interruption flag is determined to be "3", the printer server 120 sets the hold flag to "off" (Step 433) and resets the interruption flag to "0" (Step 435) to release the print spool and resets the server to the initial condition as post processing.

When the printer server 120 determines that the interruption flag is not set to "3" in Step 423 after the interruption flag is incremented in Step 421, the signal type is then determined (Step 425). In the preferred embodiment of this invention, the signal type is managed by the interruption flag and it is interpreted that the signal type is a command to issue a preparatory signal when the interruption flag is "1" while it is interpreted that the signal type is a command to issue an execution signal when the interruption flag is "2".

When the signal type is a command to issue a preparatory signal, the printer server 120 sets the hold flag to "on" to hold data in the print spool 121 (Step 427). A preparatory signal is then sent to the printer 150 side (Step 429). When the signal type is a command to issue an execution signal, the execution signal is transmitted to the printer 150 (Step 431).

Figure 4:
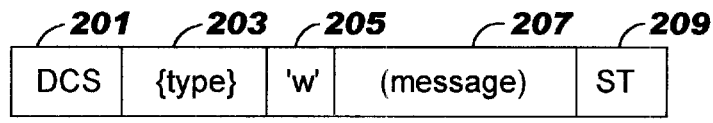
FIG. 4 is a schematic chart showing the content of a signal job in the preferred embodiment of this invention.

FIG. 4 is a schematic chart showing the format of the preparatory signal and the execution signal according to the preferred embodiment. In this example, the preparatory and the execution signals are implemented by a data stream of the LIPS (LBP Image Processing System) form. The printer 150 can identify this data stream as a preparatory signal or an execution signal using three kinds of information, DCS 201, ST 209 and w 205. While the preferred embodiment of this invention is described using the LIPS data stream, the concept of this invention is not limited only to an application to the LIPS data stream and this invention can be practiced using a data stream which is inherent to various printers and systems other than printers.

A "type" 203 is information which identifies whether the data stream is a preparatory signal or an execution signal. It is determined that the data stream is a preparatory signal when the "type"=0 while it is determined that the data stream is an execution signal when the "type"=1 in the preferred embodiment of this invention.

In the preferred embodiment of this invention, "message 207" includes information of the date and the time when this signal is issued and an execution signal includes the date and the time when the preparatory signal is issued.

2. Description of Operation of a Lower Level System

A summary of the operation of a lower level system is described with reference to FIGS. 3, 7 and 8. When the lower level system receives a first signal (preparatory signal) RBT_INI_SIG from a higher level system, it holds the time when the signal is received in its internal time. When an execution signal RBT_EXE_SIG is then received, the lower level system calculates a time difference (DIF_TMR) between the time when the first signal was received and the time when the execution signal was received.

Assuming that a time lag on the system can be neglected, the following expression holds among the time difference (INT_TMR) at the time of issuing a signal in the higher level system, the time difference (DIF_TMR) at the time of receiving a signal in the lower level system, and a job hold time (HLD_TMR) which is a time during which a job is held from being transmitted in the higher level system.

0≦DIF_TMR≦INT_TMR≦HLD_TMR

Figure 7:
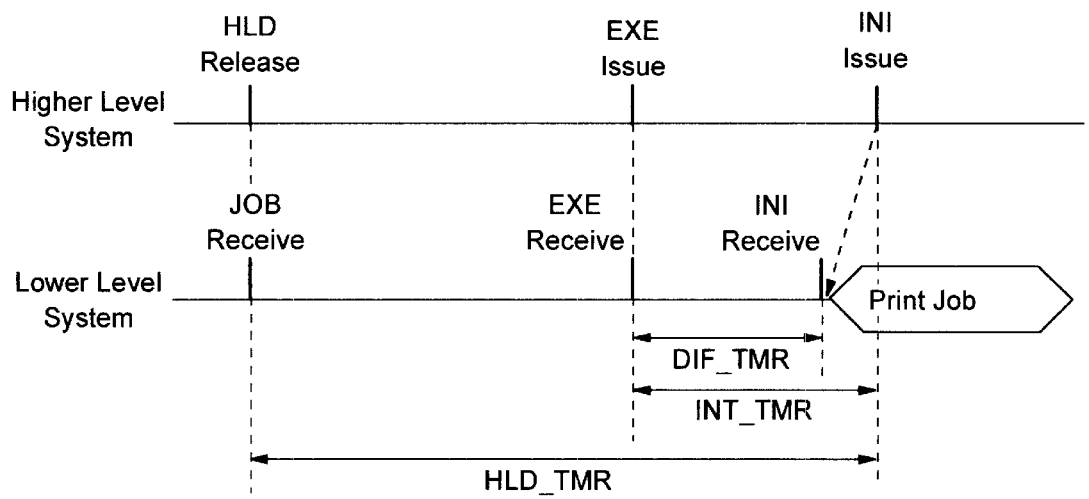
FIG. 7 is a time table explaining the operation of the higher level system and the lower level system.
Figure 8:
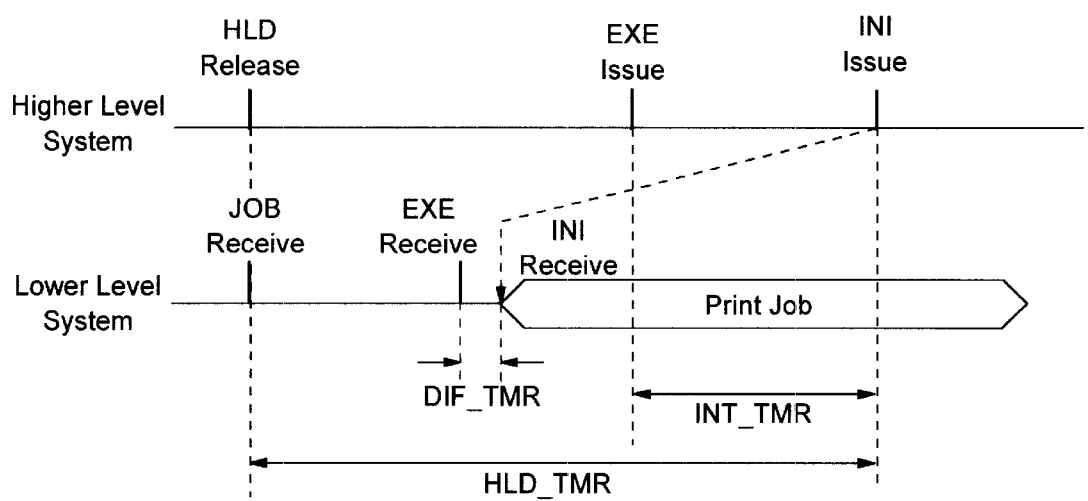
FIG. 8 is a time table explaining the operation of the higher level system and the lower level system.
Figure 9:
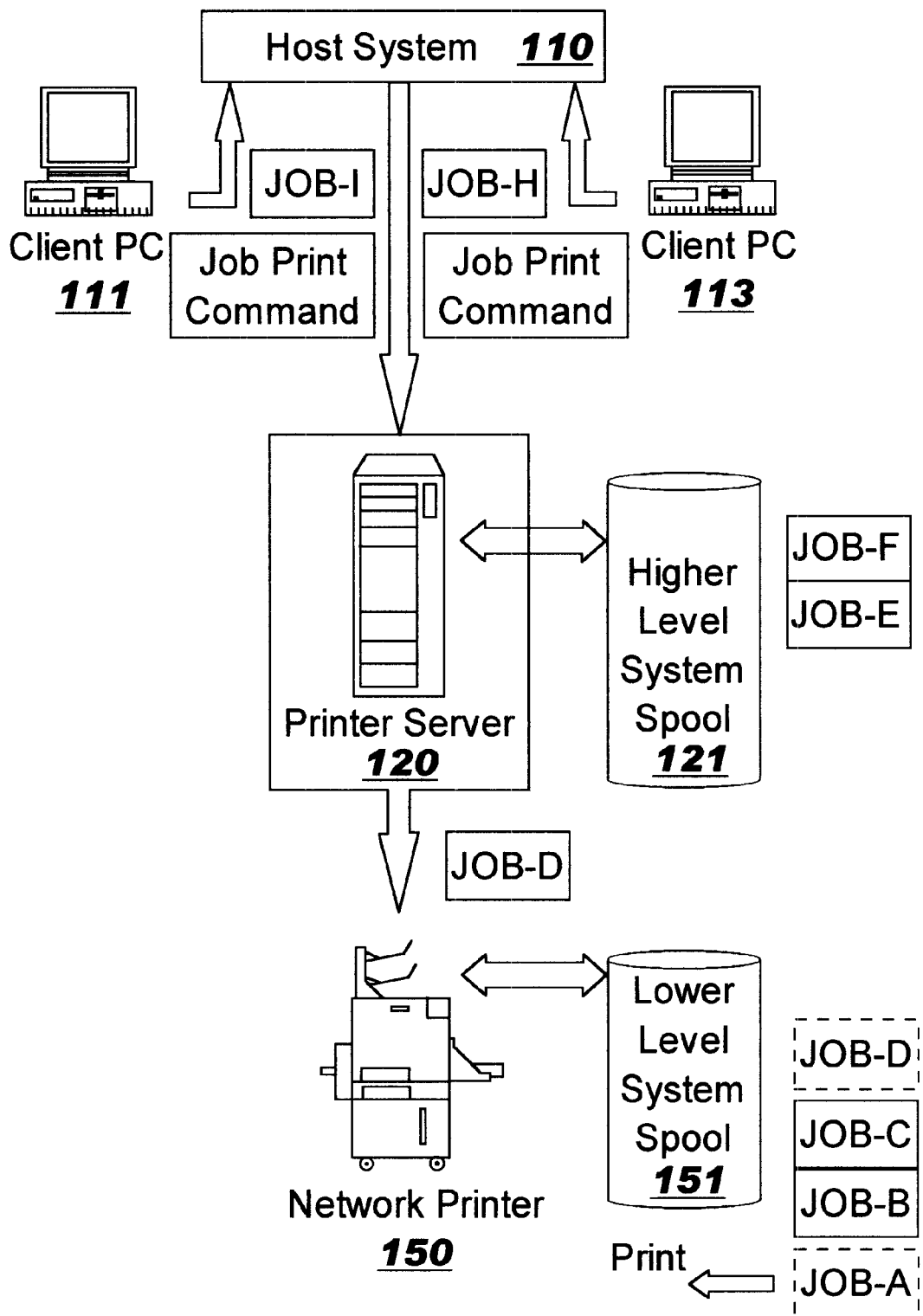
FIG. 9 is a schematic diagram showing the operation of a conventional data processing system.

FIG. 7 is a time table showing the operation of the higher level system and the lower level system in a case where a predetermined operation can be executed in the lower level system while FIG. 8 is a time table showing the operation of the higher level system and the lower level system in a case where a predetermined operation can not be executed in the lower level system.

When FIG. 7 and FIG. 8 are compared, it is seen that, when a time difference job signal is transmitted from the higher level system and stacked in the spool of the lower level system in which a considerable amount of print jobs are waiting, a time required for performing a predetermined operation is eroded as shown in FIG. 8. If the predetermined operation is forced, a job will have been received during execution of the predetermined job and will be lost because it can not be processed since a normal operation will not have been performed.

On the other hand, when the amount of print jobs is relatively small, there remains an enough time to execute the predetermined operation. Whether or not the amount of the print jobs is large enough to impede execution of the predetermined operation can be determined by seeing whether or not the DIF_TMR is larger than a predetermined value.

Accordingly, when the following relationship holds between the DIF_TMR and a minimum time difference (MIN_DIF_TMR) which is pre-defined in the lower level system, 0≦DIF_TMR≦MIN_DIF_TMR, there is almost no time difference between reception of INI and reception of EXE ant it can be determined that an EXE signal is received at a point of time immediately next to the time when the INI signal was received because a load of jobs before the INI was received is very large.

In this case, the INT_TMR and also the HLD_TMR of the higher level system may possibly have been exceeded at the time when the EXE signal is received in the lower level system. Accordingly, the lower level system does not move to a predetermined functional operation mode even if it receives the RBT_EXE_SIG and maintains a normal operational condition, waiting until the HLD_TMR of the higher level system times out.

On the other hand, when the following relationship holds between the DIF_TMR and a minimum time difference which was pre-defined in the lower level system as shown in FIG. 7, 0<MIN_DIF_TMR<DIF_TMR, it can be determined that a predetermined time difference (MIN_DIF_TMR) is assured in the time difference between reception of INI and reception of EXE. Consequently, a time of (HLD_TMR−INT_TMR) will have been available for the work of the lower level system until the higher level system releases the spool at the time when the EXE signal is received. It is also determined that a job spooled in the lower level system before receiving the INI have been completed.

While it is expected here that processing in the spool has been completed within the predetermined time difference as described in the above, it may well be possible that a further processing is stopped by some fault. Therefore, a processing timer (RST_TMR) is started for processing remaining jobs after RBT_EXE_SIG is received in the lower level system, which then moves from the normal operation mode to the predetermined functional operation mode when the remaining jobs have been processed within MAX_RST_TMR and returns to the normal operation mode after the predetermined functional operation is completed.

Putting the maximum processing time required for the predetermined functional operation as MAX_FCT_TMR and the time required for the actual processing as FCT_TMR, the following relationship holds.

RST_TMR≦MAX_RST_TMR
FCT_TMR≦MAX_FCT_TMR
(MAX_RST_TMR+MAX_FCT_TMR)<(HLD_TMR−INT_TMR)

These parameters are set in the following manner:

MAX_RST_TMR: The maximum processing time of a received job before INI is received, MAX_FCT_TMR: The maximum processing time required for the predetermined functional operation, INT_TMR : The job interval between INI_SIG and EXE_SIG, normally set to the following value as a guide;
(average job processing time)+(average job interval)

HLD_TMR: The time for JOB HOLD after INI_SIG, normally set to the following value as a guide;
(average job processing time)

On the other hand, when the remaining job have not been completed within MAX_RST_TMR, or when RST_TMR becomes greater than MAX_RST_TMR due to a system fault and the like, the lower level system does not move to the predetermined functional operation because it is difficult to assure a processing time required therefor and waits until HLD_TMR of the higher level system times out.

Figure 6:
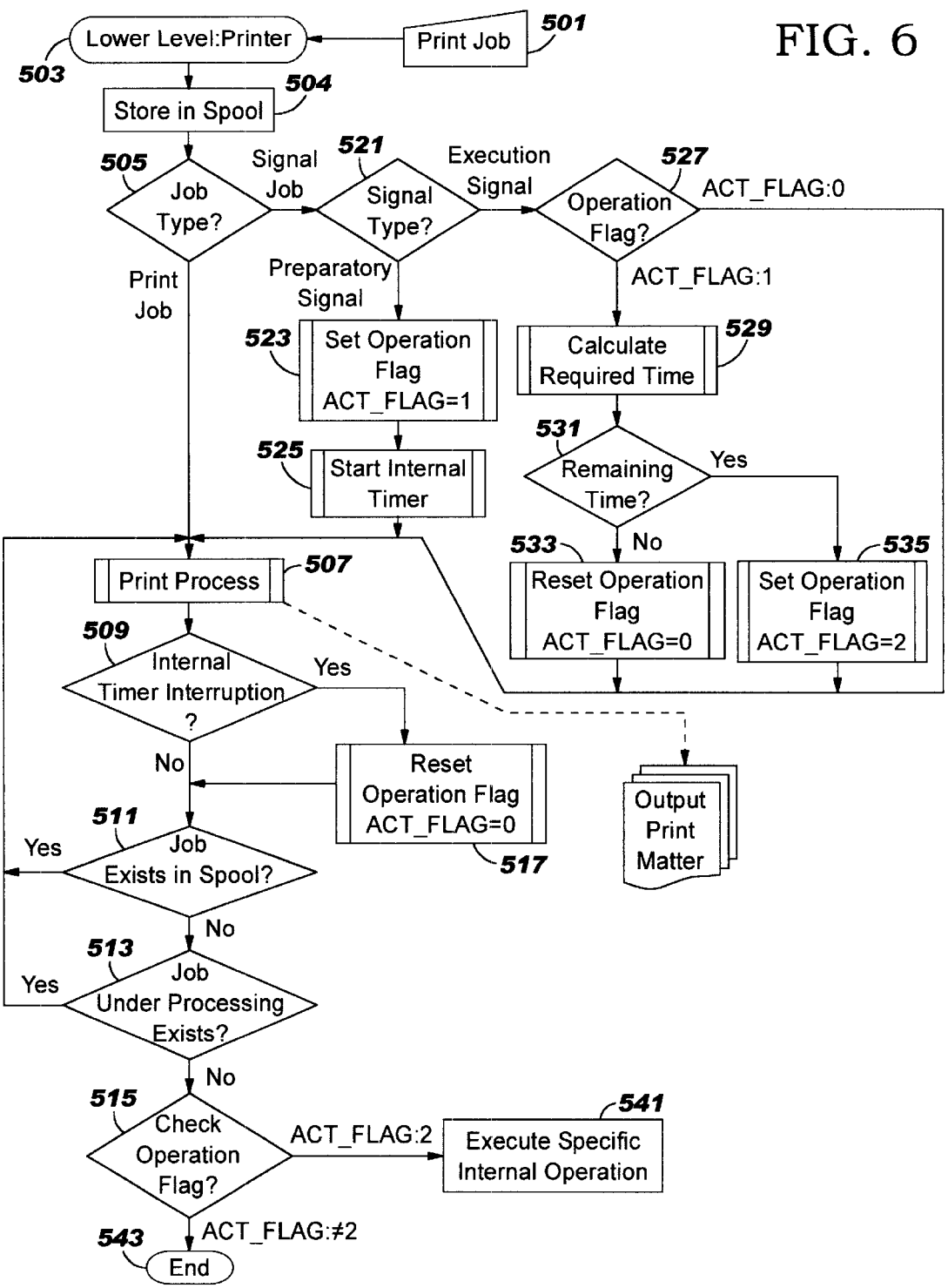
FIG. 6 is a flow chart showing an operational procedure of a lower level system in the preferred embodiment of this invention.

FIG. 6 is a flow chart showing the operational procedure of a printer which is a lower level system in the preferred embodiment of this invention. In the preferred embodiment of this invention, a job command issued in the higher level system is stored in the spool 151 upon arriving at the printer (Steps 501–504). The jobs stacked in the spool 151 are then taken out in sequence and the format of the data stream of the job is examined to determine whether it is a normal print job or a signal job (Step 505).

When it is determined that it is a normal print job, the printer 150 prints the print job as usual. When it is determined that it is a signal job, it is further determined whether it is a preparatory signal or an execution signal by examining the type information as shown in FIG. 4 (Step 521).

When it is determined that it is a preparatory signal, the operation flag is set to 1 (Step 523) and the internal timer is started to measure the elapsed time. When there is data to be printed, the printer 150 continues to print the print data to be printed.

When it is determined that the signal job is an execution signal in Step 521, the operation flag is examined and it is determined whether or not there is a cancellation of execution of the predetermined operation (Step 527). When there is a cancellation of execution of the predetermined operation, the printer 150 continues to print the print data to be printed.

When there is no cancellation of execution of the predetermined operation, the time required is calculated (Step 529). When it is determined that the time is not appropriate for executing the predetermined operation as a result of calculation, the operation flag is reset (Step 533) while it is set to "2" when it is determined that there is an enough time for executing the predetermined operation (Step 535).

When a print job is completed, the printer 150 determines whether or not there is a job in the spool 151 and starts to print the next print job when there is a job (Step 511). When it is determined that there is no job in the spool and no job under processing (Step 513), the operation flag is examined to determine whether to execute the predetermined operation or not (Step 515).

When the internal timer is started (Step 525) and a predetermined time has elapsed, an internal timer interruption is invoked in the preferred embodiment of this invention (Step 509). When the internal timer is started, the operation flag is reset to cancel execution of the predetermined operation (Step 517).

When it is determined that the operation flag is 2 in Step 515, a predetermined internal operation is executed (Step 541), the operation flag is reset (Step 542) after the end of the operation, and the procedure ends.

As described in the above, a function which is planned or implemented beforehand in the lower level system can be operated without a particular attention form a view point of a system operation or an operator operation according to this invention by performing an automatic spool control in the lower level system. It is also possible to control a job simply by a relative time difference without requiring an absolute time synchronization of the higher and lower level systems in a system in which a communication from the higher level system to the lower level system is limited to one way. In this case, the reliability of the job can be assured by assuring the job being processed before or after the functional operation.

What is claimed:

1. A method of executing a predetermined operation executed on a printer in a network system in which a plurality of print jobs are sent from a printer server to said printer, said method comprising the steps of:
    (a) receiving a plurality of print jobs sent from said printer server to hold them in a spool;
    (b) receiving a preparatory signal sent from said printer server and holding it in the spool;
    (c) receiving an execution signal sent from said printer server at predetermined interval from the preparatory signal and holding it in the spool;
    (d) taking out said plurality of print jobs successively from said spool for printing;
    (e) taking out said preparatory signal from said spool to start an internal timer;
    (f) taking out said execution signal from said spool to determine whether or not there is an enough time to execute a predetermined operation; and
    (g) executing the predetermined operation in said printer when it is determined that there is an enough time to execute said predetermined operation.

2. A method of executing a predetermined operation executed in a lower level system in a network system in which a request to process a job is sent from a higher level system to said lower level system, said method comprising the steps of:
    (a) receiving a processing request from said higher level system to hold it in a spool;
    (b) holding a preparatory signal and an execution signal sent from said higher level system in a predetermined interval in said spool;
    (c) taking out said request from said spool for processing;
    (d) determining whether or not there is an enough time to execute a predetermined operation based on a difference of the time to take out said preparatory signal and the time to take out said execution signal from said spool; and (e) executing the predetermined operation in said lower level system when it is determined that there is an enough time to execute the predetermined operation.

3. A method of executing a predetermined operation of claim 2 in which said predetermined operation is one of a system reset, clearing the spool, re-booting a module in which a fault occurred, fault diagnostic and cleaning.

4. A method of transmitting data in a network system in which a plurality of requests to process jobs are sent from a higher level system to a lower level system, said method comprising the steps of:

(a) executing a first time interruption at a first time to hold a processing request to be sent to said lower level system;

(b) transmitting a preparatory signal to said lower level system;

(c) executing a second timer interruption at a second time a predetermined time after said first time to transmit an execution signal to said lower level system; and (d) executing a third timer interruption at a third time a predetermined time after said second time to release the hold in said step (a) and resume the processing request.

5. A printer for receiving a print job sent from a printer server for printing, said printer comprising:

(a) a data receiving part for receiving a print job, a preparatory signal and an execution signal sent from said printer server, preparatory signal and the execution signal being received at predetermined interval;

(b) a spool for holding said print job, said preparatory signal and said execution signal;

(c) a job spool control part for successively taking out said print job, said preparatory signal and said execution signal held in said spool;

(d) an output part for printing a plurality of said print jobs;

(e) a time difference detecting part for analyzing the preparatory signal and the execution signal taken out from said spool;

(f) an independent timer measuring mechanism for measuring a difference of time between detecting said preparatory signal and said execution signal; and (g) a predetermined functional operation determining/ controlling part for determining whether or not there is an enough time to execute the predetermined operation based on said difference of time.

6. A lower level system for processing a processing request sent from a higher level system, comprising:

(a) a spool for holding the processing request, a preparatory signal and an execution signal sent from said higher level system, preparatory signal and the execution signal being received at predetermined interval;

(b) a processing part for taking out said processing request from said spool for processing;

(c) a time difference detecting part for detecting said preparatory signal and said execution signal;

(d) a predetermined functional operation determining/ controlling part for determining whether or not there is enough time to execute a predetermined operation based on the difference of time to take out said preparatory signal and said execution signal from said spool; and (e) a predetermined functional operation mechanism for executing the predetermined operation in said lower level system when it is determined that there is enough time to execute the predetermined operation.

7. A lower level system of claim 6 in which said predetermined functional operation mechanism executes either one of a system reset, clearing the spool, re-booting of a module in which a fault occurs, fault diagnostic and cleaning in said lower level system.

8. A higher level system for transmitting a plurality of requests to process a job, comprising:

(a) a time difference job signal generating part for generating a preparatory signal and an execution signal;

(b) a data transmitting part for transmitting a processing request, a preparatory signal and an execution signal to a lower level system;

(c) an independent timer measuring mechanism for measuring the time of executing a timer interruption; and (d) a spool holding intervention part responsive to said timer interruption to manage holding and resumption of the processing request to be sent to said lower level system.

* * * * *